(No Model.)
A. HALLETT.
PLAITING ATTACHMENT FOR SEWING MACHINES.
No. 375,744. Patented Jan. 3, 1888.
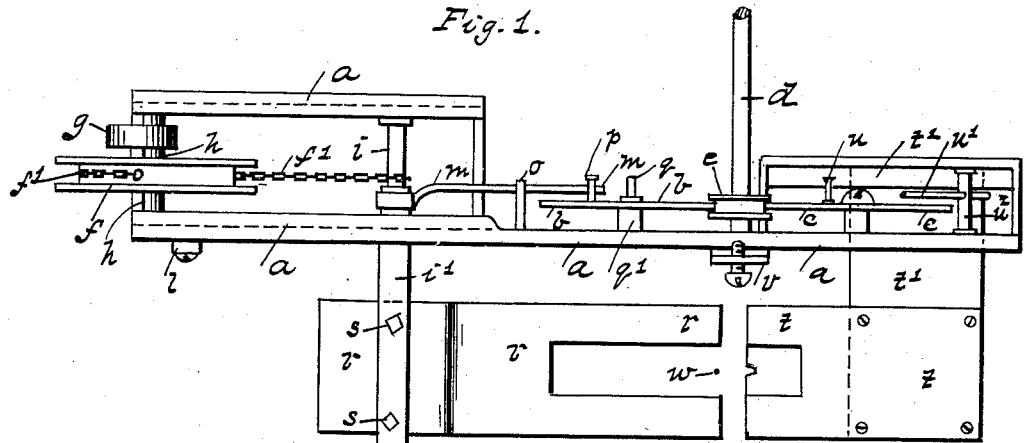
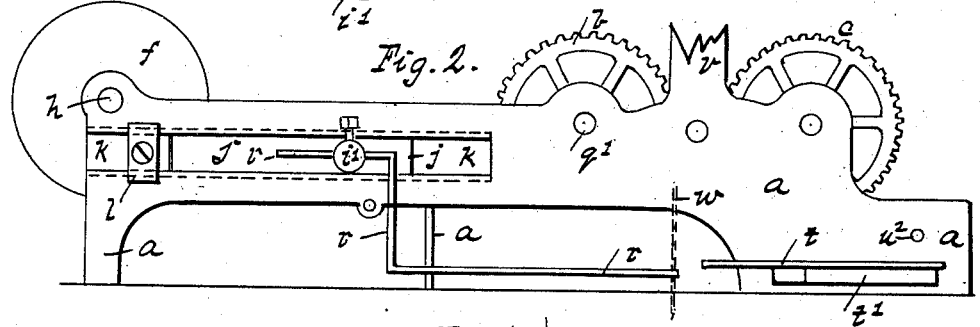
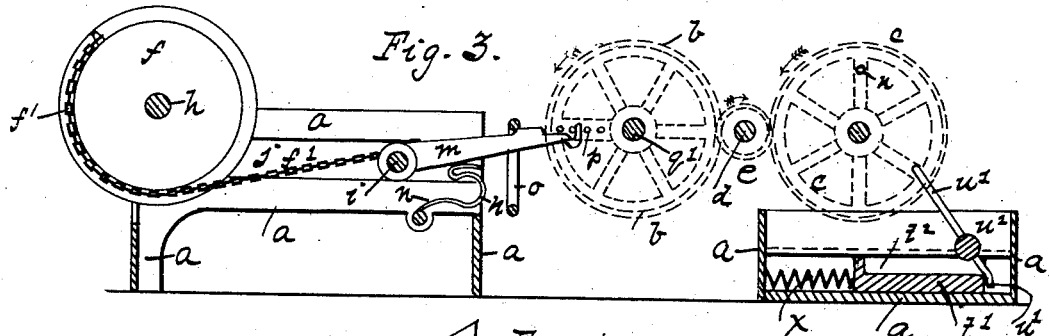
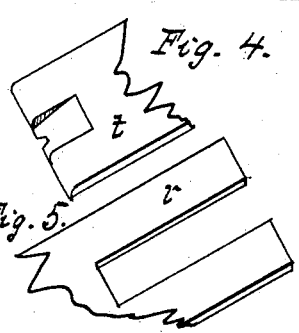
Witnesses:
M. E. Harrison.
Jno. N. Roney
Inventor
Amos Hallett
Per O. D. Lewis
Atty.

UNITED STATES PATENT OFFICE.

AMOS HALLETT, OF PITTSBURG, PENNSYLVANIA.

PLAITING ATTACHMENT FOR SEWING-MACHINES.

SPECIFICATION forming part of Letters Patent No. 375,744, dated January 3, 1888.

Application filed March 5, 1887. Serial No. 229,875. (No model.)

*To all whom it may concern:*

Be it known that I, AMOS HALLETT, a subject of the Queen of Great Britain, residing at Pittsburg, in the county of Allegheny and State of Pennsylvania, have invented certain new and useful Improvements in Plaiting or Kilting Attachments for Sewing-Machines; and I do hereby declare the following to be a full, clear, and exact description of the invention, such as will enable others skilled in the art to which it pertains to make and use the same, reference being had to the accompanying drawings, which form a part of this specification.

My invention relates to an improvement in a plaiting attachment for sewing-machines, the object being to provide a device whereby any width of plaiting may be formed by the use of the ordinary sewing-machine; and with this end in view my invention consists in certain details of construction and combination of parts, as will be fully described and claimed hereinafter.

In the accompanying drawings, Figure 1 is a plan view of my improved plaiting device constructed in accordance with my invention. Fig. 2 is a side elevation of the same. Fig. 3 is a side elevation of the attachment, having the front portion of the frame removed the better to show its working parts. Fig. 4 is a perspective view of the upper plaiting fork or plate. Fig. 5 is a perspective view of the lower plaiting-fork. Fig. 6 is a diagram showing the manner in which the plaits are formed.

To put my invention into practice I construct a metallic frame, $a$, of suitable size and form of construction, having secured thereto two gear-wheels, $b$ $c$, operated by a small shaft, $d$, and pinion $e$, connected to the driving-belt of the machine by a small pulley.

At one end of the frame $a$, I secure in proper bearings a small drum, $f$, operated by a coil-spring, $g$, one end of which is attached to the shaft $h$ of the drum $f$, and the other to the frame $a$. Between this drum $f$ and the gear-wheels $b$ $c$, I mount a horizontal shaft, $i$, in a sliding block, $j$, fixed in dovetailed grooves $k$ or slides. An adjustable block or stop, $l$, placed at one end of these grooves $k$, shortens or lengthens the movement of the shaft $i$. Secured to this horizontal shaft $i$ is a hooked pawl, $m$, having a spring, $n$, placed below the same and held in position by a guide-strip, $o$.

To one of the gear-wheels, $b$, I attach an adjustable projecting pin, $p$, which, when the wheel $b$ is in motion, engages with the hook of the pawl $m$ and moves the shaft $i$ forward until released by a projecting pin, $q$, secured in the shaft $q'$ of the gear-wheel $b$, at which time, by action of the spring $g$, drum $f$, and connecting-chain $f'$, the shaft $i$ is returned to its original position. To an extension, $i'$, of the shaft $i$, I secure an adjustable forked plate, $r$, by small screws $s$. This plate $r$ or fork I form in the manner shown at Fig. 1 on the drawings. At the front of the frame $a$, I secure another plate, $t$, to a frame, $t'$, mounted in slides $t^2$, which frame $t'$ has a short movement forward by the action of a pin, $u$, secured on the gear-wheel $c$, coming in contact with a small inclined rod, $u'$, secured in a shaft, $u^2$, and returned to position by a spring, $x$. At the top of the frame $a$, I provide a projecting flange, $v$, which, together with a screw, serves as a means of attachment to the frame of the needle-bar of the machine.

The operation is as follows: The cloth or fabric to be plaited is folded and placed between the forks $r$ and $t$, as shown at Fig. 6 on the drawings. Motion is now given by the machine to the pinion $e$, which revolves the gear-wheels $b$ and $c$ in the same direction. The projecting pin $p$ on the gear-wheel $b$ engages with the hook of the pawl $m$, and carries the same toward the operator, thereby moving the forked plate $r$ under the upper plate, $t$, carrying the fabric with it. The upper plate, $t$, now moves a short distance forward, holding the cloth until the same is caught by the needle $w$ of the machine. This operation is continued until the cloth is finished.

To shorten or lengthen the stroke of the fork $r$, and thereby increase or diminish the size of the plaits, the projecting pin $p$ from the gear-wheel $b$ is moved toward or from the center of the same. The position of the plaiting-fork $r$ is adjusted by the sliding block $l$.

Having thus described my invention, what I claim, and desire to secure by Letters Patent, is—

In a device for plaiting or kilting, the combination consisting of the frame $a$, the gear-wheels $b$ and $c$, operated by a pinion, $e$, and connected to the driving-belt of a sewing-machine, the drum $f$ and spring $g$, sliding shaft $i\ i'$ and pawl $m$, the pin $p$, projecting from the gear-wheel $b$, and a means for disengaging the pawl $m$ from the same at the proper time, the forked plates $r$ and $t$, the sliding frame $t'$, and a means for operating the same, substantially as and for the purpose specified.

AMOS HALLETT.

Attest:
H. T. MORRIS,
JNO. H. RONEY.